United States Patent [19] [11] 4,301,459
Isayama et al. [45] Nov. 17, 1981

[54] INK EJECTION APPARATUS COMPRISING ENTRAINED AIR REMOVAL MEANS

[75] Inventors: Takuro Isayama; Hiromichi Komai; Hiroshi Yamazaki; Tsutomu Sato, all of Tokyo, Japan

[73] Assignee: Ricoh Company, Ltd., Tokyo, Japan

[21] Appl. No.: 89,019

[22] Filed: Oct. 29, 1979

[30] Foreign Application Priority Data

Nov. 16, 1978 [JP] Japan ............................... 53-141429
Nov. 16, 1978 [JP] Japan ............................... 53-141430

[51] Int. Cl.[3] ............................................ G01D 15/18
[52] U.S. Cl. ................................................ 346/140 R
[58] Field of Search ............... 346/75, 140 IJ, 140 PD

[56] References Cited

U.S. PATENT DOCUMENTS 3,929,071 12/1975 Cialone et al. ............. 346/140 IJ X
4,034,380 7/1977 Isayama ....................... 346/140 PD
4,079,384 3/1978 Takano et al. ................ 346/140 IJ
4,106,030 8/1978 Hampton et al. ................ 346/75 X
4,153,902 5/1979 Kanayama ...................... 346/140 IJ
4,183,029 1/1980 Isayama et al. ................ 346/140 IJ

*Primary Examiner*—George H. Miller, Jr.
*Attorney, Agent, or Firm*—David G. Alexander

[57] ABSTRACT

An air removal unit (36) is disposed in a conduit (35) leading from an ink reservoir (34) to an ink ejection head (37). The amount of entrained air in the ink in the head (37) is sensed, and a heater (39) connected to the removal unit (36) is energized to heat the ink and boost the air removal efficiency when the amount of entrained air is above a certain value. The air removal unit (36) includes a container (47) and partitions (51), (52) provided in the container (47) to define chambers. The ink flows upwardly and downwardly through the chambers and the entrained air rises into a collection chamber (54) from which it is vented to the atmosphere.

11 Claims, 11 Drawing Figures

INK EJECTION APPARATUS COMPRISING ENTRAINED AIR REMOVAL MEANS

BACKGROUND OF THE INVENTION

The present invention relates to an ink ejection apparatus for an ink jet printer comprising means for removing entrained air from the ink.

An ink jet printer of the so-called demand type comprises an ink reservoir which communicates with the atmosphere, an ink ejection head and conduit connecting the reservoir to the head. The ink ejection head comprises a piezoelectric vibrator. To print a dot of ink, an electrical signal is applied to the vibrator which causes the same to vibrate. Expansion of the vibrator causes a pressure increase in the head which ejects ink onto a sheet of printing paper. Compression of the vibrator causes a pressure decrease which sucks ink into the head from the conduit.

A problem arises if air, especially in the form of bubbles, is entrained in the ink. The ink, due to the air, becomes compressible and is not readily ejected from the head. This is because the air compresses and absorbs the pressure applied to the ink by the vibrator.

Air is able to enter the system from the tank, since the tank is generally open to the atmosphere, especially during filling. This problem is compounded by the fact that the ink in the conduit is not pressurized. Ink can also be sucked into the ink ejection head during compression of the vibrator, generated by organic materials in the ink and temperature variations.

Various proposals have made in the prior art for removing entrained air from ink in a demand type ink jet printing apparatus. One is described in Japanese Utility Model Publication No. 52-38215 which comprises a disposable ink cartridge. While this system prevents air from entering the cartridge, it cannot prevent air from entering the conduit and ink ejection head. The disposable cartridges constitute an unnecessary expense.

Another means for removing entrained air is disclosed in Japanese patent application Nos. 53-42033 and 53-45239. Such a system comprises an air trap or filter which is designed to remove bubbles from ink flowing therethrough. However, disadvantages are present in that the flow rate through the filter decreases as the amount of trapped bubbles increases, thereby reducing the amount of ink ejection. The problem may only be overcome using means for sensing the flow rate through the filter and producing a signal when the flow rate drops below a predetermined value. In response to the signal the filter must be replaced or purged. Such a manual operation is quite undesirable.

Another prior art system is disclosed in Japanese patent application No. 52-49032 in which a piston or plunger is depressed to pressurize the ink and force air and bubbles into a collection chamber formed at the top of the ink ejection head. This system suffers from the disadvantages that a mechanism must be provided to periodically operate the piston and that the system is not easily adapted to an ink ejection apparatus comprising a plurality of ink ejection heads supplied from a single reservoir.

SUMMARY OF THE INVENTION

An ink ejection apparatus embodying the present invention includes an ink reservoir, an ink ejection head and a conduit connecting the reservoir to the head, and is characterized by comprising air removal means disposed in the conduit for removing entrained air from the ink, booster means connected to the removal means for increasing the air removing ability thereof and sensor means for sensing an amount of entrained air in the ink in the head and producing a signal when the amount of entrained air exceeds a predetermined value, the booster means being energized by the signal. The air removal means comprises a container having an inlet and an outlet and partition means provided in the container defining a plurality of ink flow chambers, the partition means being formed with openings such that ink flows from the inlet through all of the ink flow chambers to the outlet, the container defining an air collection chamber above the ink flow chambers, the ink flow chambers communicating with the air collection chamber.

In accordance with the present invention, an air removal unit is disposed in a conduit leading from an ink reservoir to an ink ejection head. The amount of entrained air in the ink in the head is sensed, and a heater connected to the removal unit is energized to heat the ink and boost the air removal efficiency when the amount of entrained air is above a certain value. The air removal unit includes a container and partitions provided in the container to define chambers. The ink flows upwardly and downwardly through the chambers and the entrained air rises into a collection chamber from which it is vented to the atmosphere.

It is an object of the present invention to provide an ink ejection apparatus comprising means for effectively removing entrained air, especially in the form of bubbles, from ink flowing through a supply conduit.

It is another object of the present invention to provide an air removal apparatus which constitutes a novel subcombination of the ink ejection apparatus.

It is another object of the present invention to provide an ink ejection apparatus which is reliable in operation and economical to manufacture on a commercial production basis.

It is another object of the present invention to provide a generally improved ink ejection apparatus.

Other objects, together with the foregoing, are attained in the embodiments described in the following description and illustrated in the accompanying drawing.

DESCRIPTION OF THE PREFERRED EMBODIMENTS

While the ink ejection apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
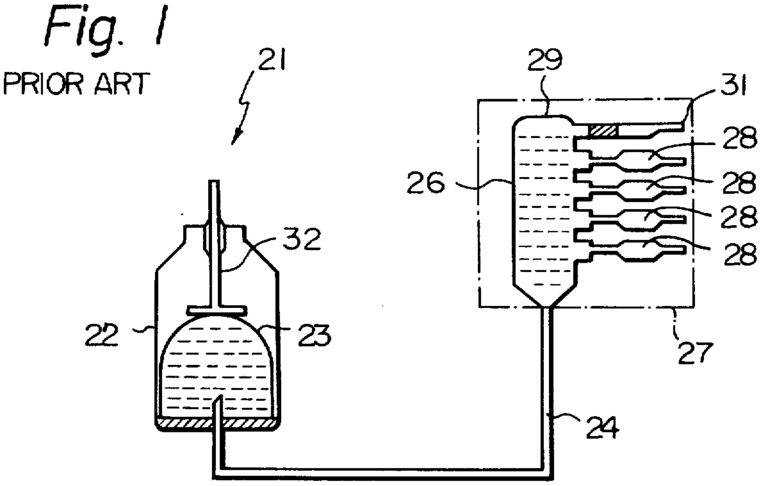
Fig. 1 PRIOR ART
FIG. 1 is a schematic diagram of an ink ejection apparatus of a prior art type.

Referring now to FIG. 1 of the drawing, a prior art ink ejection apparatus for an ink jet printing system of the type disclosed in Japanese patent application No. 52-49032 is generally designated by the reference numeral 21 and comprises an ink reservoir or container 22. Ink is enclosed in a flexible membrane 23 in the container 22. The lower portion of the membrane 23 communicates through a conduit or passageway 24 with a distribution chamber 26 of an ink ejection head 27.

The chamber 26 leads to a plurality of ink ejection nozzles 28 for ink ejection printing in a dot matrix configuration. An air collection chamber 29 is provided at the top of the distribution chamber 26 and communicates with the atmosphere through a constricted tube 31 which functions as a one-way or check valve since it allows air flow only from the chamber 29 to the atmosphere.

Unpressurized ink is supplied to the nozzles 28 from the chamber 26. Although not illustrated, each nozzle is provided with a piezoelectric element or vibrator which, when electrically energized, pressurizes the ink in the respective nozzle 28 and causes a drop to be ejected onto a sheet of printing paper.

During normal operation of the apparatus 21, air, especially in the form of bubbles, becomes entrained in the ink. Where these bubbles accumulate in the nozzles 28, they render the ink compressible and seriously degrade the ink ejection efficiency as described above.

In order to remove the bubbles, a piston 32 is depressed, thereby reducing the interior volume of the membrane 23. This causes ink to flow out of the membrane 23 into the chamber 26 and raises the level of ink in the chamber 26. The air bubbles, which rise into the collection chamber 29 due to buoyancy, are forced by the rising ink level through the tube 31 into the atmosphere. The piston 32 is progressively or periodically depressed to purge the air out of the chamber 29 through the tube 31.

The prior art system of FIG. 1 is disadvantageous as discussed in the background of the invention. The mechanism (not shown) for depressing the piston 32 is complex and the system is not practical where a number of heads 27 are supplied from a single reservoir 22.

Figure 2:
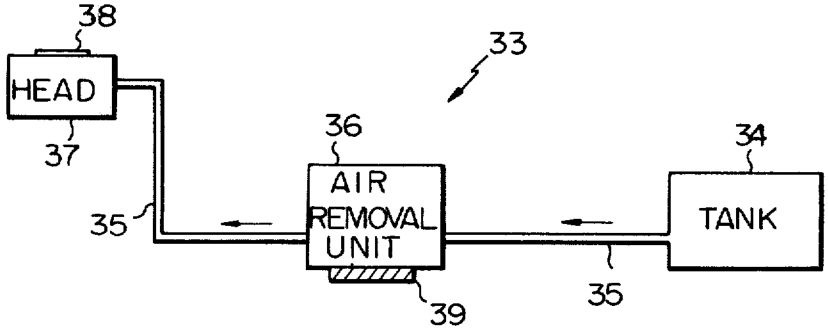
FIG. 2 is a diagram of an ink ejection apparatus embodying the present invention.

FIG. 2 illustrates the basic arrangement of the present invention. An ink ejection apparatus embodying the present invention is generally designated as 33 and comprises an ink tank or reservoir 34 for holding ink. The tank 34 is connected through a conduit 35 and an air removal unit 36 to an ink ejection head 37. The head 37 is illustrated as comprising a piezoelectric element or vibrator 38 for causing ink ejection from the head 37 when electrically energized. The apparatus 33 further comprises a booster in the form of a heater 39 which is connected to the air removal unit 36 to heat the ink therein and increase or boost the air removal efficiency.

Figure 3:
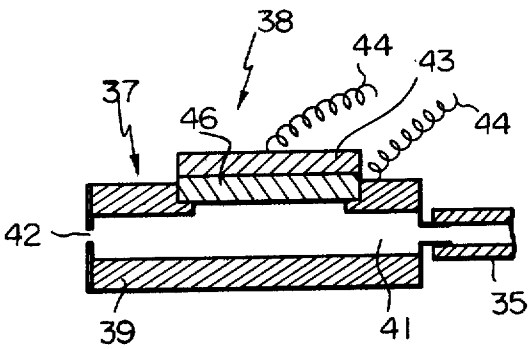
FIG. 3 is a sectional view of an ink ejection head of the present apparatus.

The ink ejection head 37 is shown in FIG. 3 as comprising a body 39 formed with a chamber 41 which communicates with the conduit 35. A constricted nozzle 42 is formed at the left end of the chamber 41. The chamber 41 is normally filled with ink due to gravity flow.

The piezoelectric element or vibrator 38 comprises a piezoelectric crystal 43 which may be electrically energized through electrical leads 44. The crystal 44 is mounted on a plate 46 which defines part of the wall of the chamber 41.

Application of an electric pulse signal to the crystal 43 causes the same to oscillate and thereby causes the plate 46 to vibrate. This increases the pressure in the chamber 41 and causes ink to be ejected out the nozzle 42 onto the sheet of paper (not shown) to print a dot.

Figure 4:
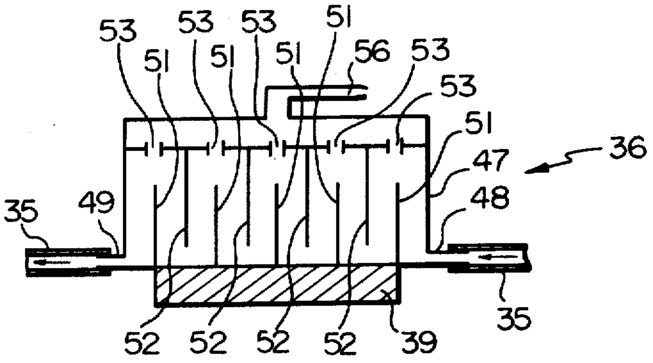
FIG. 4 is a schematic elevational view of a first embodiment of an air removal apparatus in accordance with the present invention.

A first embodiment of the air removal unit 36 is shown in FIG. 4 and comprises a container 47 having an inlet 48 and outlet 49. Partition means in the form of first vertical walls 51 and second vertical walls 52 divide the interior of the container 47 into ink flow chambers which are not designated by reference numerals to avoid cluttering of the drawing. The first walls 51 alternate with the second walls 52. Whereas the first walls 51 are formed with upper openings, the second walls 52 are formed with lower openings, the openings not being designated. Due to the configuration of the walls 51 and 52 and openings, ink is caused to flow leftwardly from the inlet 48 to the outlet 49 while passing through all of the chambers defined between the walls 51 and 52. The ink must reverse direction due to the configuration of the upper openings through the walls 51 and the lower openings through the walls 52 so as to flow upwardly through one chamber and then flow downwardly through the next chamber. This constant reversal of flow direction causes entrained air and bubbles to rise out of the ink and pass through openings 53 provided at the top of the chambers into an air collection chamber 54 provided at the top of the container 47. From the air collection chamber 54, the air, which was removed from the ink, passes into the atmosphere through a constricted tube 56 which functions as a one-way or check valve. The tube 56 prevents air, dirt and other foreign matter from entering the container 47. The heater 39 may be energized either continuously or intermittently to heat the ink in the container 47 and increase the air removal efficiency. The heater 39 may be omitted if desired.

Figure 5:
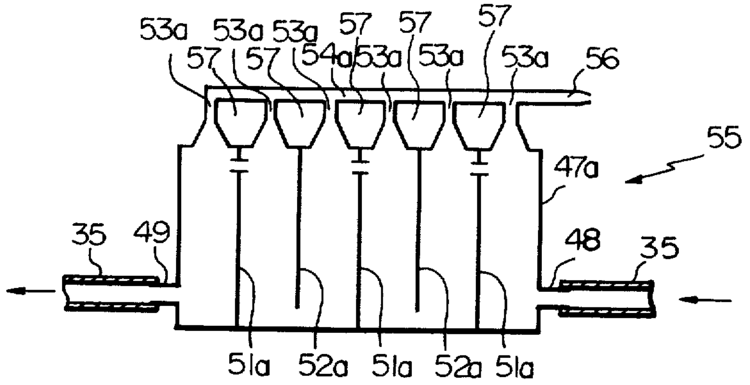
FIG. 5 is similar to FIG. 4 but shows another air removal apparatus.

FIG. 5 shows a modified embodiment of the air removal unit 36 which is here designated as 55. Like elements are designated by the same reference numerals and corresponding but modified elements are designated by the same reference numerals suffixed by the character a.

The unit 55 differs from the unit 36 in that upper openings 53*a* are defined between partitions 57 having generally triangular cross sections.

Figure 6:
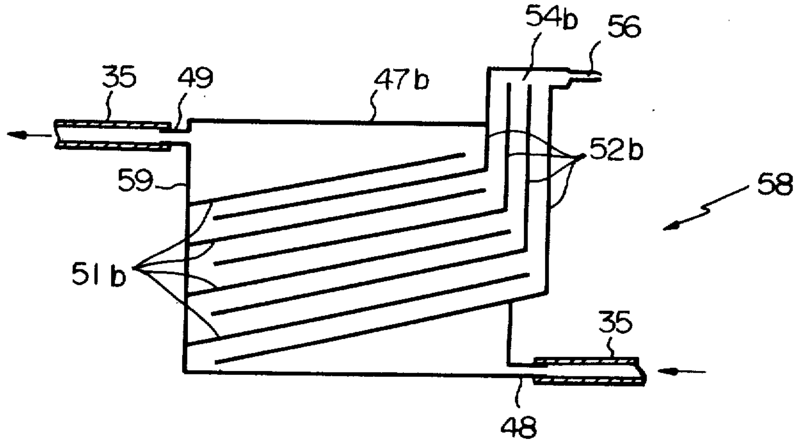
FIG. 6 is also similar to FIG. 4 but shows another air removal apparatus.

FIG. 6 illustrates another air removal unit 58 embodying the present invention in which corresponding but modified elements are designated by the same reference numerals suffixed by the character b.

Rather than extending vertically upwardly from the bottom of a container 47*b*, walls 51*b* and 52*b* extend diagonally upwardly from a side wall 59. This forces the ink to flow upwardly in a diagonal zig-zag path which is very efficient in air removal. The right portions of the walls **52*b* are bent vertically upwardly to guide removed air from the chambers between the walls 51*b* and 52*b* into an air collection chamber 54*b***.

Figure 7:
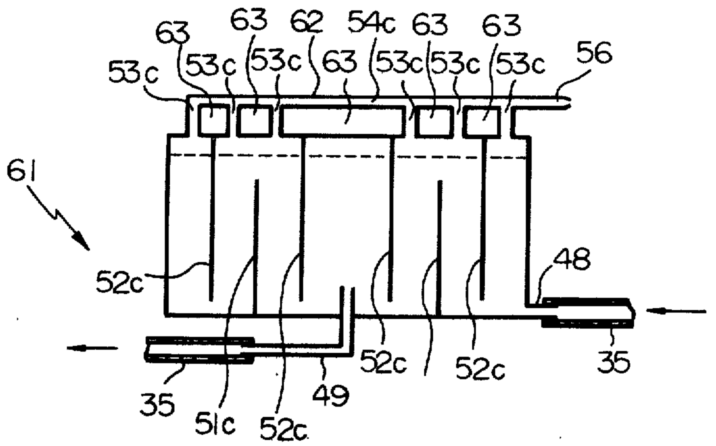
FIG. 7 is also similar to FIG. 4 but shows yet another air removal apparatus.
Figure 8:
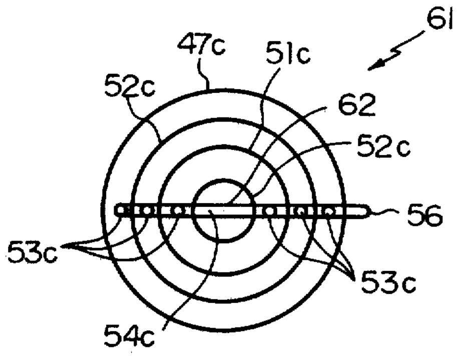
FIG. 8 is a plan view of the air removal apparatus illustrated in FIG. 7.

FIGS. 7 and 8 illustrates yet another air removal apparatus 61 embodying the present invention in which corresponding but modified elements are designated by the same reference numerals suffixed by the character c. In the apparatus 61, container **47*c* and walls 51*c* and 52*c* are circular rather than flat. The chambers between the walls 51*c* and 52*c*** are annular rather than rectangular, except for the innermost chamber which is circular.

Ink introduced through the inlet 48 fills the outermost chamber and then progressively flows through the chambers to the innermost chamber from which it flows out the outlet 49. An air collection chamber **54*c* is defined by a horizontal, diametrically extending pipe 62. The chamber 54*c* communicates with the chambers in the container 47*c* through openings 53*c* formed through a top cover 63 of the container 47*c***.

The air removal units may be formed of stainless steel, nickel-plated stainless steel or a synthetic material such as teflon.

Figure 9:
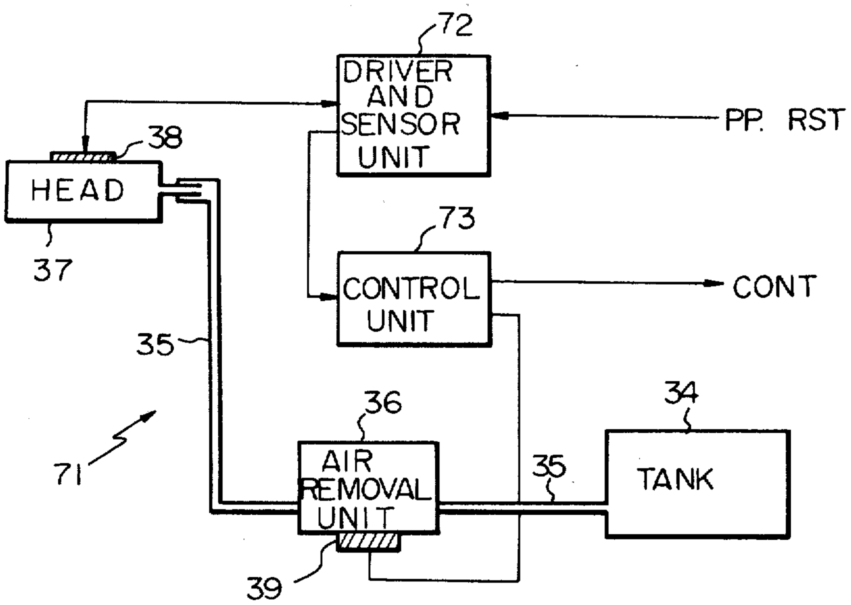
FIG. 9 is a schematic diagram of an improved ink ejection apparatus embodying the present invention.

An improved embodiment of the apparatus 33 is illustrated in FIG. 9 and designated as 71. The apparatus 71 comprises a driver and sensor unit 72 for energizing the vibrator 38 in response to a pulse signal PP. In addition, the unit 72 is operative to sense the amount of entrained air in the form of bubbles in the head 37 and produce an electrical signal corresponding thereto. The signal is fed to a control unit 73 which produces a logically low signal CONT when the amount of air is above a predetermined value. The signal CONT causes the heater 39 to be energized to increase or boost the air removal efficiency of the unit 36. The signal CONT, when logically low, may be fed to an alarm unit to produce an alarm signal and/or to temporarily interrupt the printing operation.

Figure 10:
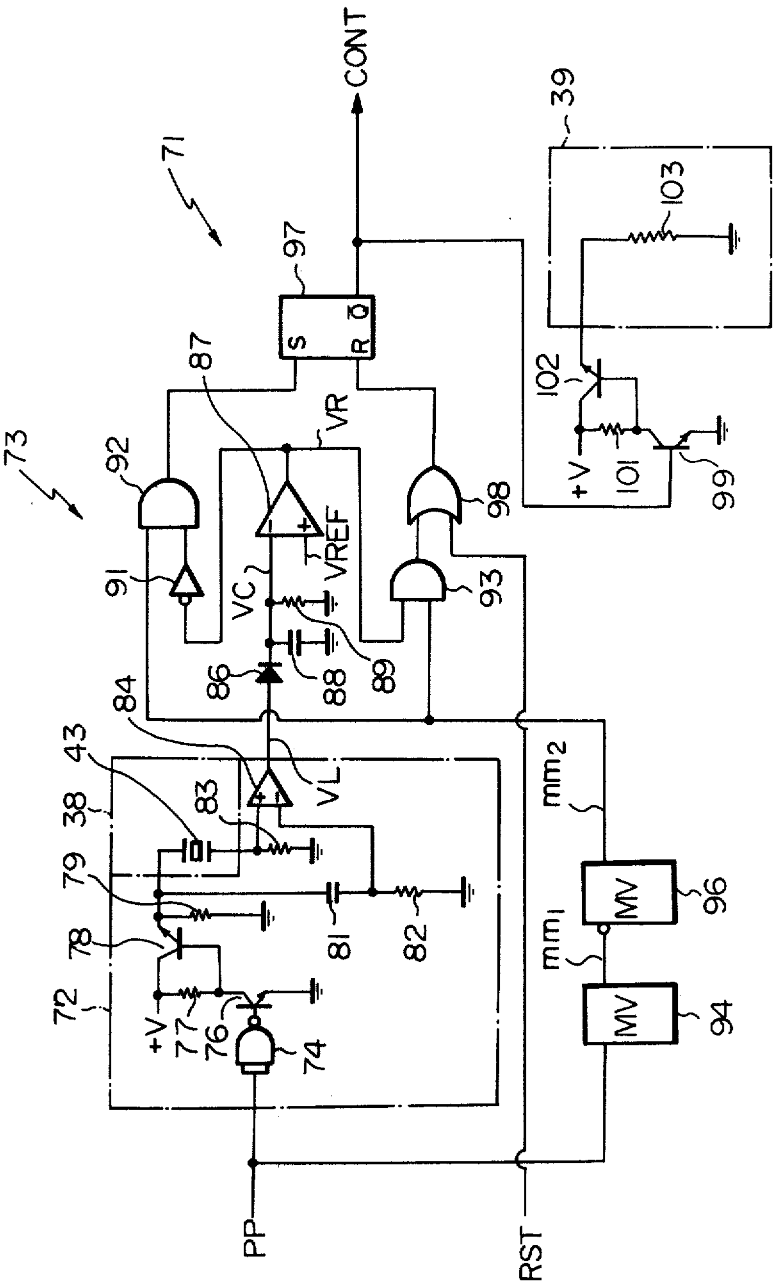
FIG. 10 is an electrical schematic diagram of the embodiment of FIG. 9.
Figure 11:
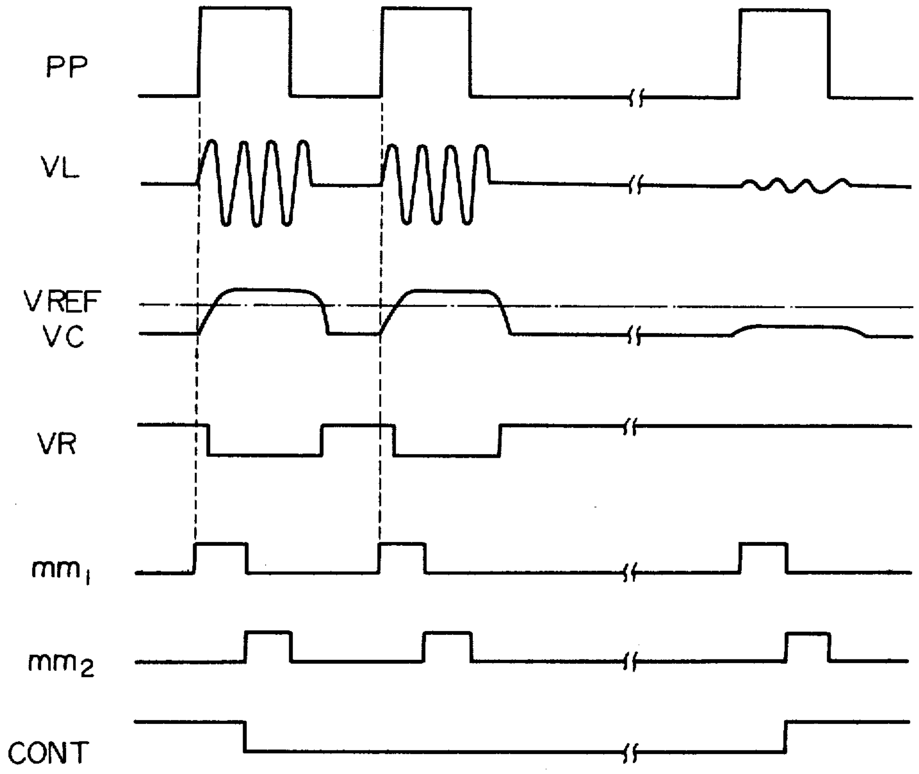
FIG. 11 is a timing diagram illustrating the operation of the embodiment of FIG. 9.

The units 72 and 73 are shown in greater detail in FIG. 10. FIG. 11 constitutes a timing diagram of the circuitry of FIG. 10. The circuitry of FIG. 10 is of the type disclosed in Japanese patent application No. 51-117530.

The signal PP is fed through a NAND gate 74 connected as a driver to the base of an NPN transistor 76. The emitter of the transistor 76 is grounded and the collector thereof is connected through a resistor 77 to a power source +V and to the base of an NPN transistor 78. The collector of the transistor 78 is connected to the source +V and the emitter of the transistor 78 is connected to ground through a resistor 79. The emitter of the transistor 78 is also connected to ground through the series connection of a capacitor 81 and resistor 82 and to ground through the series connection of the crystal 43 and a resistor 83. The junction of the crystal 43 and resistor 83 is connected to a non-inverting input of an operational amplifier 84 which is connected to function as a comparator. The junction of the capacitor 81 and resistor 82 is connected to an inverting input of the amplifier 84.

The output of the amplifier 84 is designated as VL and is connected to the anode of a diode 86, the cathode of which is connected to an inverting input of an operational amplifier 87 which is connected as a comparator. A reference voltage VREF is applied to a non-inverting input of the amplifier 87. The cathode of the diode 86 is also connected to ground through the parallel combination of a capacitor 88 and resistor 89.

The voltage at the inverting input of the amplifier 87 is designated as VC whereas the voltage at the output of the amplifier 87 is designated as VR. The voltage VR is applied through an inverter 91 to an input of an AND gate 92 and directly to an input of an AND gate 93. The signal PP is applied to inputs of the AND gates 92 and 93 through monostable multivibrators 94 and 96 which provide a delay function.

The output of the AND gate 92 is connected to a set input of a flip-flop 97. The output of the AND gate 93 and a reset signal RST are applied to inputs of an OR gate 98, the output of which is connected to a reset input of the flip-flop 97. The $\overline{Q}$ output of the flip-flop 97 is connected to the base of an NPN transistor 99, the emitter of which is grounded and the collector of which is connected to the source +V through a resistor 101. The collector of the transistor 99 is also connected to the base of an NPN transistor 102, the collector of which is connected to the source +V. The emitter of the transistor 102 is connected through a heating element 103 of the heater 39 to ground.

When the drive signal PP is low, the output of the NAND gate 74 is high. This turns on the transistor 76 which conducts and connects the emitter of the transistor 78 to ground. This turns off the transistor 78 and disconnects the crystal 43 from the source +V. The signals VL and VC are zero and the amplifier or comparator 87 produces a low output VR. The low signal VR is inverted by the inverter 91 and applied to the AND gate 92. However, the output MM2 of the multivibrator 96 is low and the AND gate 92 produces a low output as does the AND gate 93. The flip-flop 97 remains in whatever state it was previously in. If the $\overline{Q}$ output of the flip-flop 97, which constitutes the signal CONT, is high, the transistor 99 will be turned on and the transistor 102 will be turned off. Thus, the heater element 103 will be de-energized. However, if the signal CONT is low, the transistor 99 will be turned off and the transistor 102 will be turned on, allowing current flow through the heater element 103 to energize the heater 39. A high signal CONT indicates normal operation of the apparatus 71 under which conditions the amount of air in the ink is below the predetermined value and the heater 39 is de-energized. When the signal CONT is low, it indicates abnormal operation under which conditions the amount of air in the ink is above the predetermined value and the heater 39 is energized to increase the efficiency of the unit 36.

Application of the signal PP causes the transistor 76 to be turned off and the transistor 78 to be turned on. This allows current to be applied to the crystal 43 which vibrates and causes ejection of a drop of ink from the head 37. The crystal 43 will oscillate a number of times in response to each pulse PP for ejection of one drop of ink.

The larger the amount of air in the ink in the head 37, the larger will be the amplitude of oscillation of the crystal 43. This is because the air reduces the amount of resistance to oscillation or vibration of the crystal 43. The greater the amplitude of oscillation, the greater the A.C. voltage across the crystal 43 which appears at the non-inverting input of the amplifier 84. The amplifier 84 produces the signal VL as the A.C. component of the voltage applied to the amplifier 84, with the D.C. component being removed by the capacitor 81 and resistor 82.

The signal VL is rectified by the diode 86 and integrated by the capacitor 88 to produce the signal VC which is applied to the comparator 87. As shown in FIG. 11, the magnitude of the signal VC is proportional to the A.C. amplitude of the signal VL and thereby proportional to the amplitude of vibration or oscillation of the crystal 43 and the amount of air bubbles in the head 37. When the signal VC is larger than the signal VREF, indicating that the amount of air is above the predetermined value, the comparator 87 will produce a low output which is inverted by the inverter 91 and passed through the AND gate 92 to set the flip-flop 97. The signal CONT goes low to energize the heater 39.

If, however, the signal VC is smaller than the signal VREF, the comparator 87 will produce a high output which is gated through the AND gate 93 and OR gate 98 to reset the flip-flop 97. The high signal CONT will de-energize the heater 39.

The multivibrator 94 is triggered by the signal PP and produces a signal MM1. The trailing edge of the signal MM1 triggers the multivibrator 96 which produces the signal MM2. The signal MM2 enables the AND gates 92 and 93. The multivibrators 94 and 96 provide a delay which ensures that the AND gates 92 and 93 will not be enabled until the value of VC has had sufficient time to stabilize. The reset signal RST is produced when the apparatus 71 is turned on and resets the flip-flop 97. Whereas the signal PP is normally a drive signal for ink ejection, it may be generated at the start of operation of the apparatus 71 for the purpose of sensing whether the amount of air in the head 37 is excessive for printing.

In summary, it will be seen that the present invention overcomes the drawbacks of the prior art and provides an ink ejection apparatus comprising means for reliably maintaining the amount of entrained air in the ink below a predetermined level. Various modifications will become possible for those skilled in the art after receiving the teachings of the present disclosure without departing from the scope thereof. For example, the heater 37 may be maintained continuously on or omitted and the signal CONT generated only to indicate an unacceptable amount of air in the ink for the purpose of interrupting operation of the apparatus.

What is claimed is:

1. An ink ejection apparatus including an ink reservoir, an ink ejection head and a conduit connecting the reservoir to the head, chafacterized by comprising:

air rremoval means disposed in the conduit for removing entrained air from the ink;

booster means connected to the removal means for increasing the air removing ability thereof; and sensor means for sensing an amount of entrained air in the ink in the head and producing a signal when the amount of entrained air exceeds a predetermined value, the booster means being energized by the signal.

2. An apparatus as in claim 1, in which the booster means comprises a heater.

3. An apparatus as in claim 1, in which the ink ejection head comprises a piezoelectric vibrator, an amplitude of oscillation of the vibrator increasing as the amount of entrained air in the ink in the head increase, the sensor means being constructed to measure the amplitude of oscillation and produce the signal when the amplitude of oscillation exceeds a predetermined value.

4. An apparatus as in claim 1, in which the air removal means comprises a container having an inlet and an outlet and partition means provided in the container for defining a plurality of ink flow chambers, the partition means being formed with openings such that ink flows from the inlet through all of the ink flow chambers to the outlet, the container defining an air collection chamber above the ink flow chambers, the ink flow chambers communicating with the air collection chamber.

5. An apparatus as in claim 4, in which the partition means comprises first and second sets of upwardly extending walls, the first walls alternating with the second walls, the first walls being formed with upper openings and the second walls being formed with lower openings.

6. An apparatus as in claim 4, further comprising check valve means disposed between the air collection chamber and the atmosphere for allowing air flow only from the air collection chamber to the atmosphere.

7. An apparatus as in claim 6, in which the check valve means comprises a constricted tube.

8. An apparatus as in claim 4, in which the partition means comprises a plurality of upwardly extending walls.

9. An apparatus as in claim 8 in which the walls are circular.

10. An apparatus as in claim 8, in which the walls extend straight upwardly from a bottom of the container.

11. An apparatus as in claim 8, in which the walls extend diagonally upwardly from a side wall of the container.

* * * * *